United States Patent
Thomas

(10) Patent No.: US 8,209,371 B2
(45) Date of Patent: Jun. 26, 2012

(54) METHOD AND SYSTEM FOR MANAGING COMMUNICATION IN A COMPUTER NETWORK USING ALIASES OF COMPUTER NETWORK ADDRESSES

(75) Inventor: David Andrew Thomas, Atherton, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2663 days.

(21) Appl. No.: 10/289,379

(22) Filed: Nov. 7, 2002

(65) Prior Publication Data

US 2004/0093430 A1     May 13, 2004

(51) Int. Cl.
*G06F 15/16* (2006.01)
(52) U.S. Cl. ........................ 709/200; 709/238
(58) Field of Classification Search .............. 709/200, 709/246, 238, 245
See application file for complete search history.

(56) References Cited

U.S. PATENT DOCUMENTS

| | | | |
|---|---|---|---|
| 5,787,249 A | | 7/1998 | Badovinatz et al. |
| 5,793,763 A | * | 8/1998 | Mayes et al. .................. 370/389 |
| 6,006,272 A | * | 12/1999 | Aravamudan et al. ........ 709/245 |
| 6,470,389 B1 | * | 10/2002 | Chung et al. .................. 709/227 |
| 6,560,630 B1 | * | 5/2003 | Vepa et al. .................... 718/105 |
| 6,826,613 B1 | * | 11/2004 | Wang et al. ................... 709/227 |
| 7,251,692 B1 | * | 7/2007 | Raz ............................... 709/225 |
| 2002/0026531 A1 | * | 2/2002 | Keane et al. .................. 709/250 |
| 2002/0156612 A1 | * | 10/2002 | Schulter et al. ............... 703/23 |
| 2003/0014684 A1 | * | 1/2003 | Kashyap ........................ 714/4 |
| 2003/0088698 A1 | * | 5/2003 | Singh et al. ................... 709/239 |
| 2003/0154236 A1 | * | 8/2003 | Dar et al. ...................... 709/201 |

OTHER PUBLICATIONS

"Locality-Aware Request Distribution in Cluster-Based Network Servers," by Vivek S. Pai, et al. (Proceedings of the ACM Eighth International Conference on Architectural Support for Programming Languages and Operating Systems (ASPLOS-VIII), Oct. 1998).
"Interconnections, Second Edition,", Table of Contents and Preface, by Radia Perlman (Addison-Wesley, 2000).
Oliver Spatscheck, et al., "Optimizing TCP forwarder performance," IEEE/ACM Transactions on Networking, vol. 8, No. 2, pp. 146-157, Apr. 2000.
Scalable Content-aware Request Distribution in Cluster-based Network Servers, by Mohit Aron et al., Department of Computer Science, Rice University, Houston, Texas 77005, 15 pgs., 2000.

* cited by examiner

*Primary Examiner* — Glenton B Burgess
*Assistant Examiner* — Bradford F Fritz

(57) ABSTRACT

A method and system are disclosed for managing communication in a computer network using aliases of computer network addresses. In accordance with exemplary embodiments of the present invention, a primary network address and at least a secondary network address are assigned to each server among a plurality of servers connected to a switch. The secondary network address of the server is an alias for the primary network address of the server. An information packet is transmitted from a first server of the plurality of servers to the switch. A source address included in the information packet is the primary network address of the first server. The switch modifies the source address included in the information packet received at the switch to be the secondary network address of the first server. The switch forwards the modified information packet to a second server of the plurality of servers.

12 Claims, 2 Drawing Sheets

METHOD AND SYSTEM FOR MANAGING COMMUNICATION IN A COMPUTER NETWORK USING ALIASES OF COMPUTER NETWORK ADDRESSES

CROSS REFERENCE TO RELATED APPLICATIONS

This application is related to U.S. patent application entitled "Method and System for Managing Fragmented Information Packets in a Computer Network," Ser. No. 10/289,308, to U.S. patent application entitled "Method and System for Managing Connections in a Computer Network," Ser. No. 10/289,288, to U.S. patent application entitled "Method and System for Communicating Information Between a Switch and a Plurality of Servers in a Computer Network," Ser. No. 10/289,282, to U.S. patent application entitled "Method and System for Reestablishing Connection Information on a Switch Connected to a Plurality of Servers in a Computer Network," Ser. No. 10/289,311, and to U.S. patent application entitled "Method and System for Predicting Connections in a Computer Network," Ser. No. 10/289,259, each of which is filed even date herewith and each of which is hereby incorporated herein by reference in its entirety.

BACKGROUND

1. Field of the Invention

The present invention relates to computer networks. More particularly, the present invention relates to a method and system for managing communication in a computer network using aliases of computer network addresses.

2. Background Information

To access information on the Internet and, more particularly, the World Wide Web (WWW), users access websites that offer information and/or services. The information and/or services offered by a website are stored in and provided by computer network servers that are generally located remotely from the user. As the number of Internet users grow, computer network servers can experience an increase in the number of connections from clients to access the information and/or services available on these websites. To handle the increased connection load, the computer network servers can be scaled to meet the increased demand. For example, computer network servers can be replicated and the server replicas can be clustered to meet the increased demand. Thus, as the client connection load increases, more servers can be replicated and clustered. Because of their scalability and flexibility, computer network server clusters have become a popular method of meeting increasing communications traffic demands.

Computer network servers based on clusters of workstations or personal computers (PCs) generally include a specialized "front-end" device that is responsible for distributing incoming requests from clients to one of a number of "back-end" nodes, where the "back-end" nodes are responsible for processing the incoming requests from the clients. The front-end is responsible for handing off new connections and passing incoming data from the client to the back-end nodes. In cluster server architectures, the front-end can use weighted round-robin request distribution to direct incoming requests to the back-end nodes. With weighted round-robin distribution, incoming requests are distributed in round-robin fashion and are weighted by some measure of the load on the different back-ends.

To distribute the communications traffic among the back-end nodes, the front-end acts as a load balancer that attempts to evenly distribute the communications traffic load from the clients among the available back-end nodes. A load balancer can be, for example, a switch that connects the servers to the clients for whom the information and/or services are to be provided. To meet increasing connection loads, the load balancers can be upgraded with faster computer processors and more internal computer memory. To further increase performance and improve connection distribution among the back-end nodes, the front-end can use, for example, the content requested, in addition to information about the load on the back-end nodes, to choose which back-end server will handle a particular request.

Content-based request distribution is discussed in, for example, "Locality-Aware Request Distribution in Cluster-Based Network Servers," by Vivek S. Pai, et al. (Proceedings of the ACM Eighth International Conference on Architectural Support for Programming Languages and Operating Systems (ASPLOS-VIII), October 1998), the disclosure of which is incorporated herein by reference in its entirety. However, current load balancers (e.g., front-end switches) do not use the resources offered by the back-end server nodes, which are typically faster and more powerful than the load balancers, to assist the load balancer in determining the distribution of the connections among the back-end nodes. Rather, current load balancers determine request distribution autonomously from the back-end nodes.

One example of a conventional load balancer that can act as a front-end for a computer network cluster is a Layer Four (L4) switch. A L4 switch takes into account Transport Layer information (i.e., Layer Four of the International Organization for Standardization (ISO) Networking model, or ISO model). A discussion of computer network protocols and layers of the ISO model is discussed, for example, in "Interconnections, Second Edition," by Radia Perlman (Addison-Wesley, 2000), the disclosure of which is incorporated herein by reference in its entirety. L4 switches manipulate both the network and transport protocol headers of the communications traffic passing through them to forward the communications traffic to the back-end nodes. A L4 switch can operate with, for example, the Internet Protocol (IP) for the network layer and the Transport Control Protocol (TCP) for the transport layer.

To communicate information between the back-end servers and the switch, the switch inspects the destination address to determine how to forward the packet. For example, the switch can forward the packet out every port, except the port on which the packet came. However, the packet also carries a source address. When a packet arrives on a first port of the switch, the switch can store information regarding the direction from which the packet came. When future packets are received at the switch which include that source address as the destination address, the switch can use the stored information to send the packet out on the first port, rather than flooding the packets to all ports.

When the address of a first server is to be communicated to a second server for the purpose of communicating packets between the two servers, the first server can, for example, transmit a packet to the second server that contains the address of the first server. When a first switch receives the packet, the first switch can rewrite the source address of the first server with its own address. However, this can result in the loss of the Ethernet (Medium Access Control (MAC)) address of the first server, which is the information that is to be communicated to the second server. Alternatively, the switch can leave the source address of the first server intact. However, any other switches along the path to the second server will then incorrectly learn the switch port of the first server, as opposed to the port of the first switch. This can result in packets destined for the first server being forwarded down a wrong path and possibly being lost.

SUMMARY OF THE INVENTION

A method and system are disclosed for managing communication in a computer network using aliases of computer network addresses. In accordance with exemplary embodiments of the present invention, a primary network address and at least a secondary network address are assigned to each server among plural servers connected to a switch. The secondary network address of the server is an alias for the primary network address of the server. An information packet is transmitted from a first server to the switch. A source address included in the information packet is the primary network address of the first server. The switch modifies the source address included in the information packet received at the switch to be the secondary network address of the first server, then forwards the modified information packet to a second server of the plural servers.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
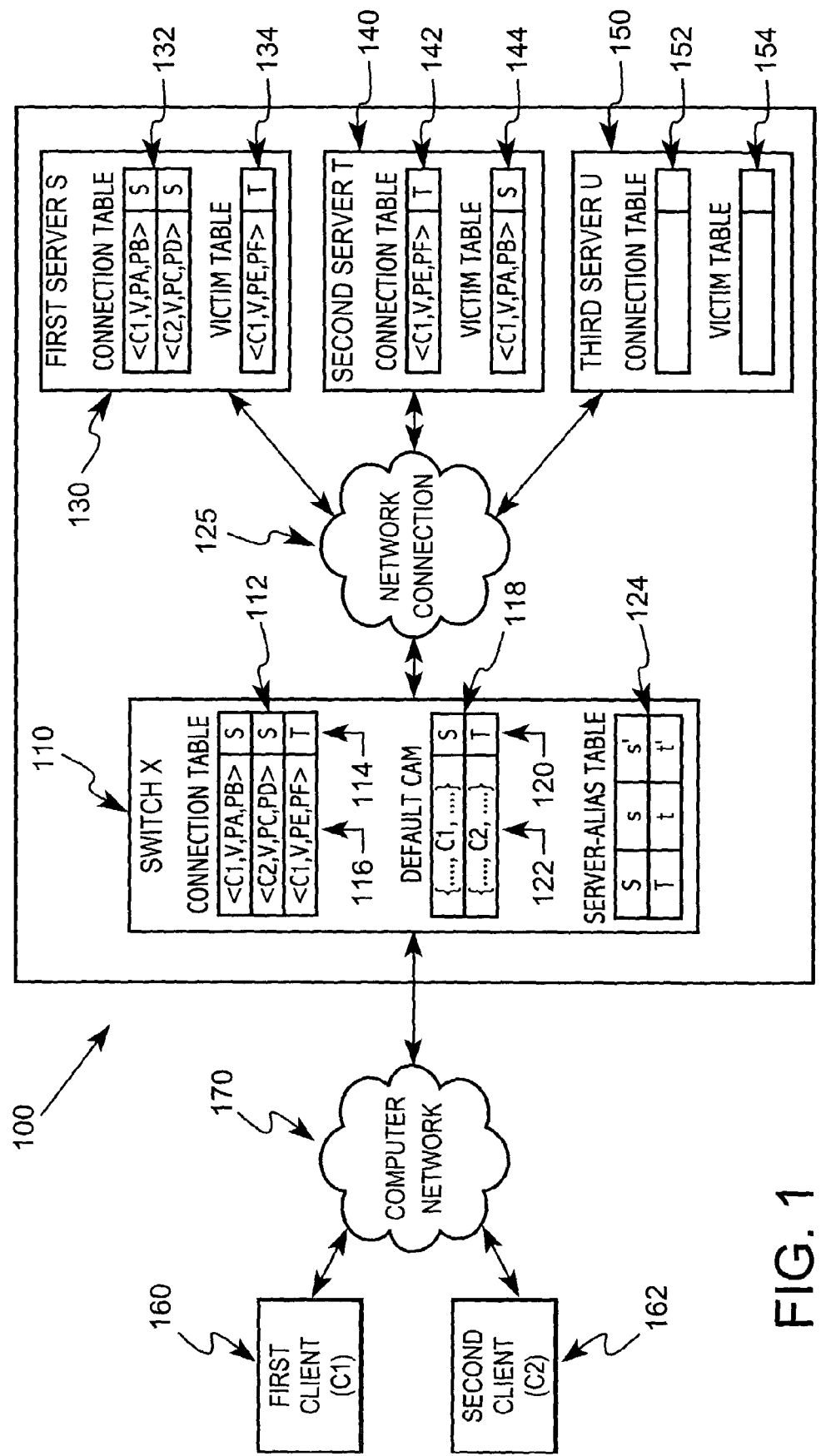
FIG. 1 is a block diagram illustrating a system for managing communication in a computer network using aliases of computer network addresses in accordance with an exemplary embodiment of the present invention.

FIG. 1 is a block diagram illustrating a system 100 for managing communication in a computer network using aliases of computer network addresses in accordance with an exemplary embodiment of the present invention. System 100 includes a switch 110 for receiving an information packet from a first server 130 of a plurality of servers. According to exemplary embodiments, a source address included in the information packet is a primary network address of the first server 130. Switch 110 is configured to modify the source address included in the information packet received by the switch 110 to be a secondary network address of the first server 130, wherein the secondary network address of each of the plurality of servers is an alias for the primary network address of each of the plurality of servers. Switch 110 is configured to forward the modified information packet to a second server 140 of the plurality of servers.

According to exemplary embodiments, computer network 170 can be any type of computer network in which information in the form of packets can be transmitted, received, otherwise communicated within and throughout the computer network. For example, computer network 170 can be a local area network (LAN), wide area network (WAN), any type of intranet or internet, or any other type of computer network or computer system capable of transporting packets of information.

As used herein, an "information packet" can be any format of aggregated bits that forms a protocol data unit (PDU) that is capable of carrying any type of information over a packet-switching network. The information packet can carry, for example, data, commands, or any other type of information. According to exemplary embodiments, an information packet can be a transmission control protocol (TCP) PDU, a user datagram protocol (UDP) PDU, or any other form of packet that is capable of carrying any type of information over a packet-switching network.

Switch 110 can receive an information packet through computer network 170 from a client, such as, for example, first client 160, second client 162, or any number of clients. As used herein, a "client" can be any type of computer system, such as, for example, a personal computer (PC), a workstation, a minicomputer, a supercomputer, or any other form of computer system capable of transmitting and receiving information packets over a computer network. According to exemplary embodiments, the client can request, for example, information or services from one or more of the plurality of servers over the computer network. Switch 110 can be connected to the clients remotely. If connected remotely, computer network 170 can be any form of WAN or for example, the Internet. However, switch 110 can be connected to the clients locally using, for example, a LAN or a direct connection to switch 110.

System 100 includes a plurality of servers (e.g., first server 130, second server 140, third server 150, and the like). According to exemplary embodiments, a primary network address and at least a secondary network address are assigned to each of the plurality of servers, with the secondary network address of each server being an alias for the primary network address. According to exemplary embodiments, each of the plurality of servers can be any type of computer system, such as, for example, a personal computer (PC), a workstation, a minicomputer, a supercomputer, or any other form of computer system capable of transmitting and receiving information packets over a computer network. According to exemplary embodiments, each server of the plurality of servers can provide, for example, information or services to one or more clients over a computer network in response to requests from the one or more clients for such information or services. System 100 can include any number of servers.

The plurality of servers can be connected to switch 110 through a network 125. Network 125 can be any type of computer network where the Layer 2 header is preserved (for example, a LAN, WAN, or any form of intranet when the Layer 2 header is preserved). The plurality of servers can be connected to switch 100 through network 125 using any form of computer network connection, such as, for example, an Ethernet connection. According to an alternate embodiment, the plurality of servers can be connected directly to switch 110 using any form of connection (e.g., electrical, optical, wired and/or wireless, or the like) capable of transmitting and receiving information between the plurality of servers and switch 110. In such an alternate embodiment, the network connection of network 125 is a direct connection. According to exemplary embodiments, although the plurality of servers can communicate with the clients through switch 110, the plurality of servers can send additional information packets to clients through computer network 170 using alternate mechanisms. For example, the plurality of servers can also include additional network interfaces that connect each of the servers to computer network 170 so that computer network communication can take place without the use of switch 110.

According to exemplary embodiments, switch 110 is a Layer 4 (L4) switch. A L4 switch takes into account Transport Layer Information (i.e., Layer 4 of the ISO model). For example, the L4 switch can examine port numbers of the TCP protocol, although switch 110 can use other transport and network protocols, such as, for example, UDP. A switch can operate at the Data Link Layer (i.e., Layer 2 of the ISO model). An exemplary Data Link Layer is Ethernet. An Ethernet switch can forward packets without modification.

In contrast to a switch, a router can operate at the Network Link Layer (i.e., Layer 3 of the ISO model). An example of a Network Link Protocol is the Internet Protocol (IP). A network router can interconnect different link layers and generate a new link layer header for each packet passing through the network router. A network router can also manipulate the IP header of packets passing through the network router.

Switch 110 can be a hybrid of the Ethernet switch and the network router. For example, switch 110 can rewrite or otherwise manipulate the link layer header of information packets, but does not modify information packets in the manner performed by routers. According to exemplary embodiments, switch 110 can use the IP protocol for the network layer and the TCP protocol for the transport layer, although different protocols can be used for the various layers.

Switch 110 can store, maintain, and manage several tables that can be used to forward information packets between the clients and the plurality of servers. Each table is a collection of information that can be stored in any type of computer memory in switch 110, such as, for example, Random Access Memory (RAM), a hard disk, or any other type of electronic storage medium. For each table, a key/value pair can be used to access information—the key is used to index and locate information in the table and the value is associated with the key.

According to exemplary embodiments, a table that can be maintained by switch 110 is a connection table 112. Connection table 112 maps connections switch 110 has been informed about to the server that is handling the connection, wherein information packets are communicated between a client and a server of the plurality of servers over the connection. Value field 114 of connection table 112 can hold the name, address or any other designation of a server. Key field 116 can be used to index or otherwise locate the value in value field 114 that corresponds to the particular key field 116. According to an exemplary embodiment, connection table 112 can be a hash table maintained in RAM of switch 110.

According to exemplary embodiments, another table that can be maintained by switch 110 is a default content addressable memory (CAM) 118. Default CAM 118 can provide, for example, an initial assignment of connections to servers and it can provide the mapping of non-first fragments to servers. According to exemplary embodiments, default CAM 118 can be a ternary CAM.

A role of the default CAM, according to exemplary embodiments of the present invention, is to implement a dispersal algorithm for handling the absence of connection information in the connection table. The default CAM can be accessed during an initial assignment of connections as mentioned, but can also be accessed when connection information has been lost, deleted, or rendered inaccessible from the connection table for any reason. The dispersal algorithm can be established at the switch by the system 100 in advance, or can be established at the switch by having at least one of the plural servers notify the switch of the dispersal algorithm to be used for allocating computer network address space of the plural servers. In this latter case, a first server can run the dispersal algorithm on all of its connections, and inform all of its potential victim servers of the connections each such victim server will be handling for the first server. Each of the remaining servers can do the same.

An exemplary dispersal algorithm can be a predetermined pattern matching algorithm implemented using a ternary CAM (or other desired mechanism). In a scenario where information (e.g., first information) is directed to the switch from a client, but there is no connection information in the connection table of the switch, the default CAM can be accessed to identify an appropriate so-called victim server to which the first information packet should be forwarded. The servers handle the forwarding of the first information packet from the victim server to the appropriate destination server. A ternary CAM is suitable for use as the default CAM because it is a content addressable memory with "don't care" matching to provide wildcards on various fields of value field 120 as accessed by key field 122. Thus, the ternary CAM can provide pattern matching. If a value matches several patterns in default CAM 118, a priority encoder can be used to determine the result. Priority encoders are described, for example, in U.S. Pat. No. 5,964,857, the entire disclosure of which is hereby incorporated herein.

For example, each information packet can include a connection tuple having a designated number of bits used to represent at least five fields for specifying a source Internet Protocol (IP) address, a destination IP address, a source port, a destination port and a protocol. These bits can be considered to designate an address space that can be allocated among the plural servers. In the absence of connection information in the connection table, the default CAM can be accessed to determine a match on a selected number of these bits (e.g., a match on the four least significant bits of the source IP address whereby a first portion of the address space from "0000" to "0010" can be allocated to a first of four servers). The information packet is thus forwarded to the server preassigned to handle any information packets within the first portion of the address space. The servers can have a preestablished mechanism (e.g., victim tables) for forwarding information packets from a particular victim server to an appropriate destination server.

As an alternate to using predetermined pattern matching, the dispersal algorithm can, for example, be a hash function. That is, any or all of the bits received in an information packet can be used to calculate an entry to a hash table, which in turn, designates an appropriate victim server.

In addition to the connection table and the default CAM, another table that can be maintained by switch 110 is a server-alias table 124. According to exemplary embodiments, server-alias table 124 can perform several functions. For example, server-alias table 124 can contain a list of the plurality of servers. The name, address or other designation of each of the servers can be the value accessed by a key to index or otherwise locate information in the server-alias table (e.g., the Ethernet address corresponding to the IP address of a server). As discussed below, server-alias table 124 can also contain a list of alias addresses for servers that are used by the switch.

According to exemplary embodiments, each of the plurality of servers can also store, maintain, and manage several tables for connection management. Each table is a collection of information that can be stored in any type of computer memory in each of the plurality of servers, such as, for example, Random Access Memory (RAM), a hard disk, or any other type of electronic storage medium. For each table, a key/value pair can be used to access information—the key is used to index and locate information in the table and the value is associated with the key.

Each of the plurality of servers can have a connection table, such as, for example, connection table 132 of first server 130. The server connection table can contain a list of the connections for which the server is the terminating server. In other words, the server connection table lists those connections that the server is handling. Each of the plurality of servers also includes a victim table, such as, for example, victim table 134 of first server 130. The victim table can contain the connection and fragment information that the server handles on behalf of another server. In other words, the victim table lists the non-terminating connections on which the server will receive packets. For each of the information packets received on the non-terminating connection, the victim table lists the terminating server to which the non-terminating server can relay the information packets. As already mentioned, the victim tables can be populated as a function of the selected dispersal algorithm.

For purposes of illustration, as shown in FIG. 1, IP addresses are denoted by uppercase letters (e.g., C1, C2, S, T, U). Ethernet addresses (i.e., Medium Access Control (MAC) addresses) are denoted by lowercase letters (e.g., c1, c2, s, t, u). As discussed below, switch 110 can masquerade as a server to pass server address information from one server to another. When switch 110 masquerades as a server, it can use alias addresses denoted by lowercase letters with apostrophes (e.g., s', where s' is an alias for s).

According to exemplary embodiments, switch 110 can connect a plurality of servers to clients over computer network 170. Thus, the switch can act as a "front-end" to the plurality of servers, while the plurality of servers can act as the "back-end." According to exemplary embodiments, IP aliasing can be used when communicating information packets between the plurality of servers and the clients through switch 110. With IP aliasing, switch 110 and the plurality of servers are addressed to clients using a single, collective IP address (e.g., an address "V"). In other words, switch 110 and the plurality of servers appear as a single computer system with a single IP address (e.g., address "V"), such that "knowledge" of the separate components of system 100 is hidden from the clients.

Thus, when a client addresses switch 100 and plurality of servers, the client simply sends an information packet to a single IP address (e.g., address "V"). Switch 110 will then direct the packet to the server handling the connection to the client. When sending information packets to clients using IP aliasing, each of the plurality of servers can write the IP source address as the single, collective IP address (e.g., address "V"), and not the server's unique IP address. However, according to exemplary embodiments, at the Ethernet layer, each of the plurality of servers can use their individual Ethernet addresses (i.e., MAC address) as their source Ethernet address.

According to exemplary embodiments, amongst the Layer 2 (L2) (i.e., Ethernet) packet layer, Layer 3 (L3) (i.e., IP) packet layer, and the L4 (e.g., TCP) packet layer, there are six fields which can used to represent packets in system 100: an Ethernet destination address (from the L2 packet layer); an Ethernet source address (from the L2 packet layer); a source IP address (from the L3 packet layer); a destination IP address (from the L3 packet layer); a source port (from the L4 packet layer); and a destination port (from the L4 packet layer). Those skilled in the art will appreciate that an additional protocol field can be included (e.g., to identify TCP), and need not be discussed further. For purposes of illustration and not limitation, a packet from first client 160 (i.e., "C1") to system 100 (i.e., "V") can have the following fields, where "s" represents the Ethernet address of first server 130, "x" represents the Ethernet address of switch 110, and "PA" and "PB" are the source and destination TCP ports, respectively: [x, c1, C1, V, PA, PB]. For example, if first server 130 is handling the connection, the switch 110 can rewrite the packet as: [s, x, C1, V, PA, PB]. When the server sends a reply, the server uses the IP alias "V" instead of its own IP address. Consequently, the reply packet is: [x, s, V, C1, PB, PA].

As noted, the reply packet swaps the source and destination IP addresses. From this swapping, a canonical addressing format can be used to represent packets as follows: <client IP address, server IP address, client port, server port>. In accordance with exemplary embodiments of the present invention, the canonical addressing format is used to represent packets and connections in system 100 of FIG. 1. According to exemplary embodiments, if the packet came from a client, then the fields are in canonical form. If the packet came from a server, then the fields can be swapped to generate the canonical form. Switch 110 can use server-alias table 124 to determine if the packet was sent by a server, and, therefore, the fields should be rearranged. Alternatively, if "V" is the source IP address, then the fields should be swapped. By using a canonical form in accordance with exemplary embodiments, connection table 112 can use a single entry to track a connection for each packet direction. Alternatively, two indices can be used—one for each packet direction.

According to exemplary embodiments, when the address of first server 130 is to be communicated to second server 140 for the purpose of communicating packets between the two servers, the first server 130 can, for example, transmit an information packet to the second server 140 that contains the address of the first server 130. First server 130 can communicate its identity to second server 140 for the purposes of, for example, updating the victim table in the second server 140 with the computer network address of the first server 130 (e.g., where second server 140 is to act as a victim server for first server 130).

A victim server can be designated to handle connections on behalf of the first server in situations where there is no connection information for the connection in the switch's connection table. For example, if the first server 130 was previously handling a connection, but that connection was closed, then the connection entry for that connection will have been deleted by the switch 110 from its connection table 112. In this case, the switch will use the default CAM to forward the information packet to the victim server. Alternatively, if information packets arrive without a complete L4 header, switch 110 will be unable to find a corresponding connection entry in its connection table 112, and will send such information packets to the selected victim server using the default CAM.

If an information packet arrives at switch 110 and there is no connection entry in the connection table 112 for the connection on which the information packet arrived, or the connection information in the information packet is incomplete (e.g., it is a fragment where there is not a full header), switch 110 consults its default CAM 118 to determine the victim server that will handle the information packet according to the dispersal algorithm. Where second server 140 is the designated victim server for a given connection, switch 110 forwards the information packet(s) to second server 140. The second server 140 can then use its victim table to forward the information packet on to the first server. Although second server 140 can act as the victim server, one or more of the back-end servers can act as a victim server(s) for any other back-end server.

To establish a victim server association with the second server, the first server 130 communicates its identity to the second server 140. That is, the first server 130 can send an information packet to the second server via the switch, where the source address included in the information packet is the primary network address of the first server 130.

In forwarding this information packet on the second server, the switch can rewrite the source address with its own address. However, this could result in the loss of the Ethernet (Medium Access Control (MAC)) address of the destination back-end server (i.e., first server 130), which is the information that is to be communicated to the second server 140. If the switch leaves the source address intact, switches along the path from the switch 110 to the second server 140 can incorrectly learn the switch port of the first server 130.

Exemplary embodiments of the present invention therefore address these problems by having the switch 110 modify the source address included in the information packet received by the switch 110 to be a secondary network address of the first server 130 (that is, an alias address for the primary network address). Each server can have an alias address, but the alias address is not used in a destination address. Rather use of the alias address of each server can be limited to use as a source address, and information packets with the alias address are sent by the switch 110. In other words, the alias address can be reserved for use by the switch.

Any method for allocating addresses to servers can be used to allocate the secondary network address (i.e., alias address) to each of the plurality of servers. For example, all servers can have two (globally assigned) unique addresses, one for use as their actual address (the primary network address), and another (the secondary network address) reserved for use by the switch 110. The primary network address and the secondary network address can be two consecutive addresses (e.g., an even address and an odd address) to permit, for example, a bit-flipping convention. Alternatively, global end-system Ethernet (MAC) addresses can be used for the primary network address. The global/local bit of the Ethernet (MAC) header of the global address can be flipped (to indicate "local") to generate a locally-administered Ethernet (MAC) address as the secondary network address. However, the secondary network address can be allocated to each of the plurality of servers using any method for allocating addresses.

According to exemplary embodiments, before the information packet from the first server 130 is forwarded to second server 140 by switch 110, switch 110 can replace the computer network address (i.e., Ethernet (MAC) address) of first server 130 in the information packet with the alias of a computer network address of first server 130. The switch associates the secondary network address to the primary network address for each server of the plurality of servers. For example, the switch 110 can consult its server-alias table 124 to determine the alias (i.e., secondary network address) of the first server 130. The switch 110 can then replace the Ethernet (MAC) source address of the information packet with an alias of the computer network address of first server 130, rather than the actual Ethernet (MAC) source address of first server 130. The switch 110 can then forward the modified information packet to the second server 140.

For purposes of illustration and not limitation, an example of pseudo-code that can be used by switch 110 to perform aliasing in system 100 is shown below, where "DA" is destination address and "SA" is source address:

```
if (information packet)
    if (connection exists)
        Process full header and send (to first server 130);
    else {
```

```
        // Either the connection exists or the address information
        // contained in the header of information packet header is
        // incomplete. In either instance, there is no connection entry
        //
        // in the connection table.
        //
        // Search default CAM 118 to determine where to send
        // the information packet.
        //
        // Result from a lookup in default CAM 118.
        //
        MAC DA = MAC address of second server 140;
        if (source is client) {
            MAC SA = MAC address of switch 110;
        }
        else {
            MAC SA = secondary network address of
            first server 130;
        }
    }
```

Once second server 140 receives the information packet from switch 110, second server 140 can map the alias address of the first server 130 to the first server 130. The second server 140 can modify its victim table 144 to create an entry in victim table 144 which contains the address of the first server, but not the alias address of the first server. The entry in victim table 144 of second server 140 informs second server 140 that subsequent information packets received via the switch (e.g., from a client) with a particular source IP address or information fragment identifier (e.g., the 16-bit identification field of the IP header) are to be forwarded to the address of first server 130. Thus, once created, second server 140 can forward the information packets to the first server 130 using its victim table 144.

Exemplary embodiments of the present invention use the TCP protocol for the L4 packet layer. However, those of ordinary skill in the art will recognize that other transport layer and network protocols, such as, for example, the UDP protocol, can be used in accordance with exemplary embodiments for the L4 packet layer.

Figure 2:
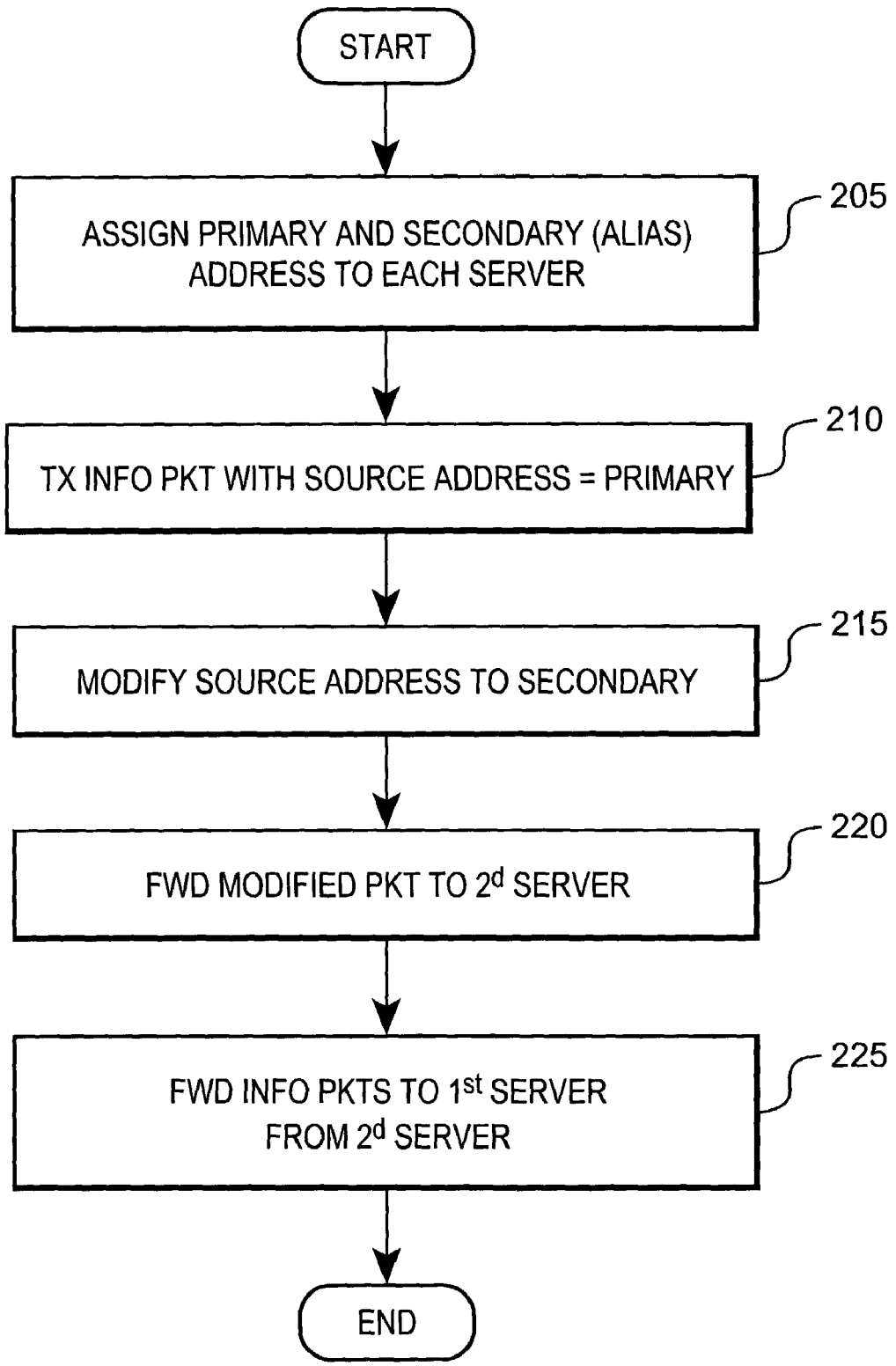
FIG. 2 is a flowchart illustrating a method for managing communication in a computer network using aliases of computer network addresses in accordance with an exemplary embodiment of the present invention.

FIG. 2 is a flowchart illustrating steps for managing communication in a computer network using aliases of computer network addresses in accordance with an exemplary embodiment of the present invention. According to exemplary embodiments, the computer network can be any type of computer network in which information in the form of packets can be transmitted, received, otherwise communicated within and throughout the computer network. In step 205, a primary network address and at least a secondary network address are assigned to each server in a plurality of servers connected to a switch. According to exemplary embodiments, the secondary network address of the server is an alias for the primary network address of the server. Each of the plurality of servers can have the properties and characteristics of the plurality of servers as discussed with reference to FIG. 1.

In step 210 of FIG. 2, an information packet is transmitted from a first server of the plurality of servers to a switch. According to exemplary embodiments, a source address included in the information packet is the primary network address of the first server. The switch can be a L4 switch that can be a hybrid of an Ethernet switch and a network router. For example, the switch can have the properties and characteristics of switch 110 of FIG. 1.

In step 215 of FIG. 2, the switch can modify the source address included in the information packet received by the switch to be the secondary network address of the first server. According to exemplary embodiments, before the information packet from the first server is forwarded to the second server by the switch, the switch can replace the primary network address (i.e., Ethernet (MAC) address) of the first server in the information packet with the alias of a primary network address of the first server.

The switch can associate the secondary network address to the primary network address for each server of the plurality of servers. For example, the switch can consult its server-alias table to determine the alias of the first server. The switch can then replace the Ethernet (MAC) source address of the information packet with an alias of the computer network address of first server, rather than the actual Ethernet (MAC) source address of first server.

In step 220, the switch forwards the modified information packet to a second server of the plurality of servers. Once the second server receives the information packet from the switch, the second server can map the alias address of the first server to the first server. The second server can modify its victim table to create an entry in its victim table. The entry in its victim table informs the second server that, for example, information packets with the particular source IP address and/or information fragment identifier (e.g., the 16-bit identification field of the IP header) are to be forwarded to the address of the server contained in the information packet with the alias address of the first server. In step 225, the second server can forward to the first server information packets received by the second server from a client using the victim table.

The steps of a computer program as illustrated in FIG. 2 for managing communication in a computer network using aliases of computer network addresses can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for managing communication in a computer network using aliases of computer network addresses, comprising:
assigning a primary network address and at least a secondary network address to each server among plural servers connected to a switch, wherein the secondary network address of the server is an alias for the primary network address of the server;
transmitting a first information packet from a first server of the plural servers to a switch to communicate an identity of the first server to a second server and to establish the second server as a victim server for the first server, wherein a source address included in the information packet is the primary network address of the first server;
receiving, at the switch, a second information packet destined for the first server while connection information to the first server is lost, deleted, or inaccessible from a connection table at the switch;
modifying, by the switch, the source address included in the first information packet received by the switch to be the secondary network address of the first server, thus creating a modified information packet;
forwarding, by the switch, the modified information packet to the second server; and
forwarding, by the switch, the second information packet to the second server that serves as the victim server for the first server and receives the second information packet on behalf of the first server when the connection information to the first server is lost, deleted, or inaccessible.

2. The method of claim 1, wherein the primary network address and the secondary network address are consecutive addresses.

3. The method of claim 1, wherein the switch associates the secondary network address to the primary network address for each server of the plurality of servers.

4. The method of claim 1, comprising:
forwarding, by the second server, the information packets to the first server, the information packets intended for the first server but included insufficient connection information to the first server.

5. The method of claim 1, wherein the switch modifies the source address included in the information packet so other switches along a path from the switch to the second server correctly learn a switch port of the first server.

6. The method of claim 1 further comprising:
receiving, at the second server, the information packets;
consulting, by the second server, a victim table to determine to which server to forward the information packets;
forwarding, by the second server, the information packets to the first server per the victim table.

7. A system for managing communication in a computer network using aliases of computer network addresses, comprising:
a plurality of servers comprising processors and memory, wherein a primary network address and at least a secondary network address are assigned to each of the plurality of servers, wherein the secondary network address of each of the plurality of servers is an alias for the primary network address of each of the plurality of servers; and a switch that: receives a first information packet from a first server of the plurality of servers, wherein a source address included in the first information packet is the primary network address of the first server, modifies the source address included in the information packet received by the switch to be the secondary network address of the first server, thus creating a modified information packet, forwards the modified information packet to a second server of the plurality of servers to communicate an identity of the first server to the second server and to establish the second server as a victim server for the first server, receives a second information packet while connection information to the first server is lost, deleted, or inaccessible, and forwards the second information packet to the second server that functions as the victim server for the first server.

8. The system of claim 7, wherein the primary network address and the secondary network address are consecutive addresses.

9. The system of claim 7, wherein the switch associates the secondary network address to the primary network address for each server of the plurality of servers.

10. The system of claim 7, wherein the second server consults a victim table to identify the first server as an intended destination for the information packets, and forwards the information packets to the first server.

11. The system of claim 7, wherein the switch modifies the source address included in the information packet so other switches along a path from the switch to the second server correctly learn a switch port of the first server.

12. The system of claim 7, wherein the second server servers as the victim server for the first server when there is no connection information to the first server and when the switch is unable to find the connection information to the first server in a connection table.

* * * * *

UNITED STATES PATENT AND TRADEMARK OFFICE
CERTIFICATE OF CORRECTION

| | |
|---|---|
| PATENT NO. | : 8,209,371 B2 |
| APPLICATION NO. | : 10/289379 |
| DATED | : June 26, 2012 |
| INVENTOR(S) | : David Andrew Thomas |

Page 1 of 1

It is certified that error appears in the above-identified patent and that said Letters Patent is hereby corrected as shown below:

In the Claims:

In column 14, line 8, in Claim 12, delete "servers" and insert -- serves --, therefor.

Signed and Sealed this
Eighteenth Day of June, 2013

Teresa Stanek Rea
*Acting Director of the United States Patent and Trademark Office*